(12) United States Patent
Steinmeyer et al.

(10) Patent No.: US 11,704,824 B2
(45) Date of Patent: Jul. 18, 2023

(54) METHOD AND DEVICE FOR DETERMINING A PARALLAX PROBLEM IN SENSOR DATA OF TWO SENSORS

(71) Applicant: VOLKSWAGEN AKTIENGESELLSCHAFT, Wolfsburg (DE)

(72) Inventors: Simon Steinmeyer, Braunschweig (DE); Thorsten Graf, Gifhorn (DE); Michael Schlichte, Braunschweig (DE)

(73) Assignee: Volkswagen Aktiengesellschaft

( * ) Notice: Subject to any disclaimer, the term of this patent is extended or adjusted under 35 U.S.C. 154(b) by 413 days.

(21) Appl. No.: 16/986,485

(22) Filed: Aug. 6, 2020

(65) Prior Publication Data

US 2021/0042951 A1 Feb. 11, 2021

(30) Foreign Application Priority Data

Aug. 9, 2019 (DE) .................... 10 2019 212 022.9

(51) Int. Cl.
*G06T 7/593* (2017.01)
*G01S 17/86* (2020.01)
(Continued)

(52) U.S. Cl.
CPC .............. *G06T 7/593* (2017.01); *G01C 3/085* (2013.01); *G01S 13/08* (2013.01); *G01S 13/867* (2013.01);
(Continued)

(58) Field of Classification Search
CPC .......... G06T 7/593; G06T 2207/30252; G06T 7/0002; G06T 7/97; G06T 2207/10012;
(Continued)

(56) References Cited

U.S. PATENT DOCUMENTS

2009/0190800 A1* 7/2009 Takahashi .............. G06V 20/58
382/104
2015/0235093 A1* 8/2015 Shima ..................... G06T 7/254
382/103
(Continued)

FOREIGN PATENT DOCUMENTS

| DE | 102015201747 A1 | 8/2016 |
| EP | 3416134 A1 | 12/2018 |
| WO | 2015129907 A1 | 9/2015 |

OTHER PUBLICATIONS

Shima, Y. , "Inter-vehicle distance detection based on keypoint matching for stereo images," 2017 10th International Congress on Image and Signal Processing, BioMedical Engineering and Informatics (CISP-BMEI), 2017, pp. 1-6, doi: 10.1109/CISP-BMEI.2017.8302064. (Year: 2017).*

*Primary Examiner* — Amandeep Saini
*Assistant Examiner* — Daniella M. DiGuglielmo
(74) *Attorney, Agent, or Firm* — Barnes & Thornburg, LLP

(57) ABSTRACT

A method for detecting a parallax problem in sensor data from two sensors spaced apart from each other and at least partly capturing the same environment, wherein at least one of the sensors provides distance information. The method includes obtaining the acquired sensor data from the sensors; assigning measured values in the acquired sensor data of one sensor to corresponding measured values in the acquired sensor data of the other sensor, wherein the assignment takes the respective imaging conditions of the two sensors into account; consecutively numbering the measured values in the sensor data; checking whether a sorting order of the numbering of the measured values that correspond to each other matches, a parallax problem being determined in response to a sorting order not matching; and outputting a test result. Also disclosed is an apparatus for detecting a (Continued)

parallax problem in sensor data from two sensors and a transportation vehicle.

8 Claims, 1 Drawing Sheet

(51) Int. Cl.
*G01S 17/08* (2006.01)
*G01S 17/931* (2020.01)
*G01S 17/89* (2020.01)
*G01S 13/08* (2006.01)
*G01C 3/08* (2006.01)
*G01S 13/86* (2006.01)
*H04N 13/246* (2018.01)

(52) U.S. Cl.
CPC .............. *G01S 17/08* (2013.01); *G01S 17/86* (2020.01); *G01S 17/89* (2013.01); *G01S 17/931* (2020.01); *H04N 13/246* (2018.05); *G06T 2207/10012* (2013.01); *G06T 2207/30252* (2013.01)

(58) Field of Classification Search
CPC . G06T 2207/10028; G06T 2207/30168; G01S 17/08; G01S 17/86; G01S 17/931; G01S 17/89; G01S 13/08; G01S 7/40; G01S 7/497; G01S 13/867; G01C 3/085; H04N 13/246
See application file for complete search history.

(56) References Cited

U.S. PATENT DOCUMENTS

2016/0005180 A1* 1/2016 Matono .................. G06T 7/593
348/47
2020/0103918 A1* 4/2020 Lee ........................ G06V 10/25

\* cited by examiner

METHOD AND DEVICE FOR DETERMINING A PARALLAX PROBLEM IN SENSOR DATA OF TWO SENSORS

PRIORITY CLAIM

This patent application claims priority to German Patent Application No. 10 2019 212 022.9, filed 9 Aug. 2019, the disclosure of which is incorporated herein by reference in its entirety.

BACKGROUND

Modern transportation vehicles have a plurality of assistance systems that can assist a driver in driving the transportation vehicle, or drive the transportation vehicle partially automatically or automatically. To do so, the assistance systems require information about an environment of the transportation vehicle. This information is collected by sensors and made available to the assistance systems as sensor data. The sensors usually work on the basis of different measuring principles. Examples include a laser scanner, a LIDAR sensor or a radar sensor with elevation detection, which provide distance information or three-dimensional measurements, or a camera.

As a rule, the sensors are arranged at different positions on or in the transportation vehicle. As a result, the individual sensors capture the environment of the transportation vehicle from different directions. In in a subsequent sensor data fusion process, this can cause a parallax problem, because sensor data from different sensors of an object acquired from different directions comprise different parts of the object and therefore sometimes cannot be correctly associated with each other. The incorrect association of the sensor data can lead to an incorrect distance estimate.

Specification WO 2015/129907 A1 discloses a distance measuring device and a parallax calculation system.

SUMMARY

Illustrative embodiments relate to a method and an apparatus for detecting a parallax problem in sensor data from two sensors. Illustrative embodiments also relate to a transportation vehicle.

BRIEF DESCRIPTION OF THE DRAWINGS

Disclosed embodiments are described in greater detail with reference to the figures. In the drawings.

DETAILED DESCRIPTION

Figure 1:
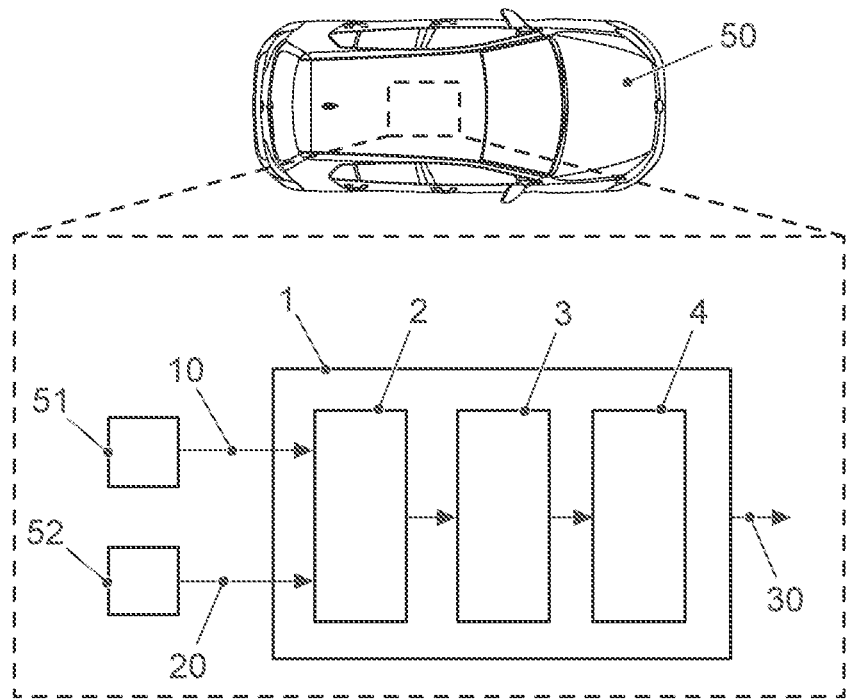
FIG. 1 shows a schematic representation of an exemplary embodiment of the apparatus for detecting a parallax problem in sensor data from two sensors.

Disclosed embodiments provide a method and an apparatus which can be used to detect a parallax problem in the sensor data from two sensors.

A method for detecting a parallax problem in sensor data from two sensors is provided, wherein the sensors are spaced apart from each other at different positions and at least partly capture the same environment, and at least one of the sensors provides distance information, the method comprising: obtaining the acquired sensor data from the sensors, assigning measured values in the acquired sensor data of one sensor to corresponding measured values in the acquired sensor data of the other sensor, wherein the assignment takes into account the respective imaging conditions of the two sensors, consecutively numbering the measured values in the sensor data, checking whether a sorting order of the numbering of the measured values that correspond to each other matches, a parallax problem being determined if a sorting order does not match, outputting a test result.

Furthermore, an apparatus is created for detecting a parallax problem in sensor data from two sensors, the sensors being arranged at positions that are spaced apart from each other and at least partially capturing the same environment, and at least one of the sensors providing distance information, the apparatus comprising an input device, a computing device and an output device, wherein the input device is designed to receive acquired sensor data from the sensors, the computing device is designed to assign measured values in the acquired sensor data of the one sensor to corresponding measured values in the acquired sensor data from the other sensor, the assignment taking into account the imaging conditions of the two sensors, to consecutively number measured values in the sensor data and check whether a sorting order of the corresponding measured values matches, and to detect a parallax problem if a sorting order does not match, and wherein the output device is designed so as to output a verification result.

The method and the apparatus enable a parallax problem to be detected in sensor data collected from two sensors which at least partially capture the same environment but are located at different installation positions. This is achieved by assigning individual measured values in the sensor data of the sensors to each other, the process taking into account the respective imaging conditions of the respective sensors. The individual measured values in the sensor data are consecutively numbered separately for each of the sensors. In the case of two-dimensional sensor data, this is carried out by rows and columns (i.e., measured values 1 to n for each row and measured values 1 to n for each column). The sorting orders are then compared with each other based on the assignments made between the measured values in the sensor data from the sensors. In the case of two-dimensional sensor data, this is carried out line-by-line and column-by-column. If there is no parallax problem present, the sorting orders will correspond, i.e., a measured value with the number 1 of the sensor data of the sensor providing the distance information corresponds with a measured value with the number 1 of the sensor data of the other sensor, and so on. If, on the other hand, a parallax problem exists, for example, because an object detected by the sensors is located very close to the sensors, the sorting orders will not correspond, at least not completely (for example, the measured value with number 8 of the sensor data of the sensor providing the distance information is positioned before a measured value with the number 5 of the other sensor, as a result of the assignment process taking into account the imaging conditions). If the sorting orders do not match, a parallax problem is detected. A verification result is then output, for example, as a verification result signal or as a digital data packet.

The benefits of the described method and the apparatus are that they are simple to implement and only require a small amount of computing power.

The imaging conditions include the conditions under which the sensor data are acquired by the sensors, such as an optical imaging, an opening angle, a detection range and/or a detection time. By taking into account the respective imaging conditions, it is possible to assign the sensor data of the sensors to each other.

The sensor providing the distance information is a laser scanner or a Light Detection and Ranging (LIDAR) sensor, a radar sensor with elevation measurement, or a stereo camera. For example, the sensor providing the distance information provides sensor data as three-dimensional measured values, which are determined by time-of-flight measurements.

The other sensor can be a camera, for example. The camera provides sensor data as one or more camera images. In principle, the other sensor can additionally provide distance information.

It is provided that the sensor data of the at least one sensor providing the distance information and of the other sensor are synchronized. This means that the sensor data are identical to each other in relation to a detection range and a time base, i.e., they at least partly image the same section of the environment at the same time. In principle, such a synchronization can be carried out in advance by various methods. Objects can be tracked in the image space of the sensor data by optical flow and matching of three-dimensional image points in the image space (object tracking). In addition, objects can be tracked in the sensor data of the at least one sensor providing the distance information. Based on this object tracking, a time corresponding to associated sensor data can be estimated in the sensor data of the other sensor, so that the sensor data can be synchronized. Furthermore, the sensor data of the sensors can be acquired synchronously, for example, by using a common trigger signal.

It may be provided that the sensor data are interpolated to allow the sensor data to be assigned to each other. This is particularly necessary when the sampling rates of the sensors are different.

Parts of the apparatus, in particular, the computing device, may be implemented individually or collectively as a combination of hardware and software, for example, as program code which is executed on a microcontroller or microprocessor.

It may be provided that the method is carried out for additional sensors, in which case sensor data from the sensors are then always compared with each other in pairs.

The measured values are measurement points. However, it may also be provided that the measured values are features derived from the sensor data, such as edge points in a captured camera image, which are determined from a larger area of the camera image.

In at least one disclosed embodiment, it is provided that the assignment of the measured values is carried out by back projection of the measured values of the sensor data of the at least one sensor providing the distance information into an image space formed from the measured values of the sensor data of the other sensor. This makes it particularly simple and quick to check if a parallax problem is present. For example, if the sensor providing the distance information is a LIDAR sensor and the other sensor is a camera, the measured values of the sensor data of the LIDAR sensor are projected into the corresponding camera image, in other words individual measured values of the sensor data of the LIDAR sensor are assigned to individual measured values or image elements in the camera image according to the respective imaging conditions of the sensors. However, the consecutive numbering is performed separately for the sensor data of the LIDAR sensor and the sensor data of the camera (i.e., the camera image), independent of the back projection. The sorting orders are then checked on the basis of the assignment of the measured values carried out via the back projection.

In at least one disclosed embodiment, it is provided that, to check the sorting order, a sign of angular changes between adjacent measured values of the sensor data of the at least one sensor providing the distance information is evaluated with respect to the corresponding measured values of the sensor data of the other sensor, a parallax problem being detected if at least one sign change occurs during the angle changes. This allows a quick and simple checking.

For this purpose an angle is determined between measured values of the sensor data of the sensor providing the distance information, with respect to the corresponding measured values of the sensor data of the other sensor. In the example with the LIDAR sensor and the camera, the measured values of the sensor data of the LIDAR sensor are back projected into the camera image, taking the imaging conditions into account. Then, angles (e.g., azimuth as seen from the camera) are determined for the individual back-projected measured values of the sensor data of the LIDAR sensor with respect to the camera in the camera image. The angular changes between the sorted back-projected measured values are determined. If a change of a sign of the angle change occurs at any point as the individual measured values are scanned according to a sequence of the sorting order, a parallax problem is detected, because in this case the corresponding measured value in the back projection has jumped in the opposite direction.

In at least one disclosed embodiment, it is provided that measured values of the sensor data of the at least one sensor acquiring the distance information, which are located within a range defined by a non-matching sorting arrangement, are marked as invalid. Although in principle the sensor data marked as invalid can still be used by the assistance systems, a fusion of the sensor data of the two sensors considered is no longer possible, at least in some regions, as the measured values marked as invalid are only acquired by one of the two sensors.

In a further disclosed embodiment it is additionally checked whether, in the case of an object detected by the sensors, sensor data of the at least one sensor providing the distance information completely capture the object with respect to a dimension characterized by the distance between the sensors, a verification result derived from this being taken into account when checking for the parallax problem. This can be used to ensure that an object has been fully captured. In the case in which no parallax problem is detected for a region around a detected object, it can be ensured that the object has been completely captured, and so the validation result is correct when checking the parallax problem.

Features for the exemplary embodiment of the apparatus are obtained from the description of disclosed embodiments of the method. The benefits of the apparatus are the same as those of the exemplary embodiments of the method.

A transportation vehicle comprising two sensors is also provided, wherein the sensors are arranged at positions spaced apart from each other and at least partly capture the same environment, and at least one of the sensors provides distance information. In addition, the transportation vehicle comprises an apparatus according to any one of the embodiments described.

In another exemplary embodiment of the transportation vehicle, it is provided that the sensor providing the distance information is a LIDAR sensor and the other sensor is a camera.

FIG. 1 shows a schematic representation of an exemplary embodiment of the apparatus 1 for detecting a parallax problem in sensor data 10, 20 from two sensors 51, 52. The apparatus 1 and the sensors 51, 52 are arranged in a transportation vehicle 50. The apparatus 1 comprises an input device 2, a computing device 3 and an output device 4.

The sensors 51, 52 are arranged at different positions spaced apart from each other and at least partially detect the same environment. The sensor 51 provides distance information. For example, the sensor 51 is a laser scanner or a LIDAR sensor that provides sensor data 10 as three-dimensional measured values. For example, the sensor 52 is a camera that provides sensor data 20 as camera images. The sensors 51, 52 detect the environment 60 shown in FIG. 2, for example.

The input device 2 receives the sensor data 10, 20 acquired by the sensors 51, 52 and synchronizes these data on a common time base.

The computing device 3 assigns measured values in the acquired sensor data 10 of the sensor 51 to corresponding measured values in the acquired sensor data 20 of the other sensor 52. The assignment takes into account the imaging conditions of the two sensors 51, 52. In simple terms, this means that a sight-ray examination is carried out, in which, on the basis of the detection directions from which the individual measured values are acquired at an opening angle of the respective sensor 51, 52, the measured values are assigned on the basis of mutually corresponding sight rays or detection directions. The aim is to assign to each other those measured values which, when taking into account the respective imaging conditions, image the same region in the environment.

The measured values in the sensor data 10, 20 are consecutively numbered separately for each of the sensors 51, 52 by the computing device 3. These consecutively numbered measured values are shown schematically in FIG. 2, wherein the numerals Sx are assigned to the respective measured values or sight rays 11, 21 that correspond to them.

The computing device 3 then checks whether a sorting order of the mutually assigned measured values matches. If the sorting order does not match, the computing device 3 detects a parallax problem. Otherwise, the computing device 3 does not detect a parallax problem. A verification result 30 is then output by the output device 4. The verification result 30 also includes information as to which part of the sensor data 10, 20 is affected.

It can be provided that the assignment of the measured values is carried out by back projection of the measured values of the sensor data 10 of the at least one sensor providing the distance information 51 into an image space formed from the measured values of the sensor data 20 of the other sensor 52.

It can also be provided that, to check the sorting order, a sign of angular changes between adjacent measured values of the sensor data 10 of the at least one sensor 51 providing the distance information is evaluated with respect to the respective corresponding measured values of the sensor data 20 of the other sensor 52, a parallax problem being detected if at least one sign change occurs during the angle changes.

Furthermore, it may be provided that measured values of the sensor data 10 of the at least one sensor 51 acquiring the distance information, which are located within a range defined by a non-matching sorting order, are marked by the computing device 3 as invalid.

It can be provided that an additional check is made to determine whether, in the case of an object detected by the sensors, sensor data 10 of the at least one sensor 51 providing the distance information completely capture the object with respect to a dimension characterized by the distance between the sensors 51, 52, wherein a verification result derived from this is taken into account when checking the parallax problem.

Figure 2:
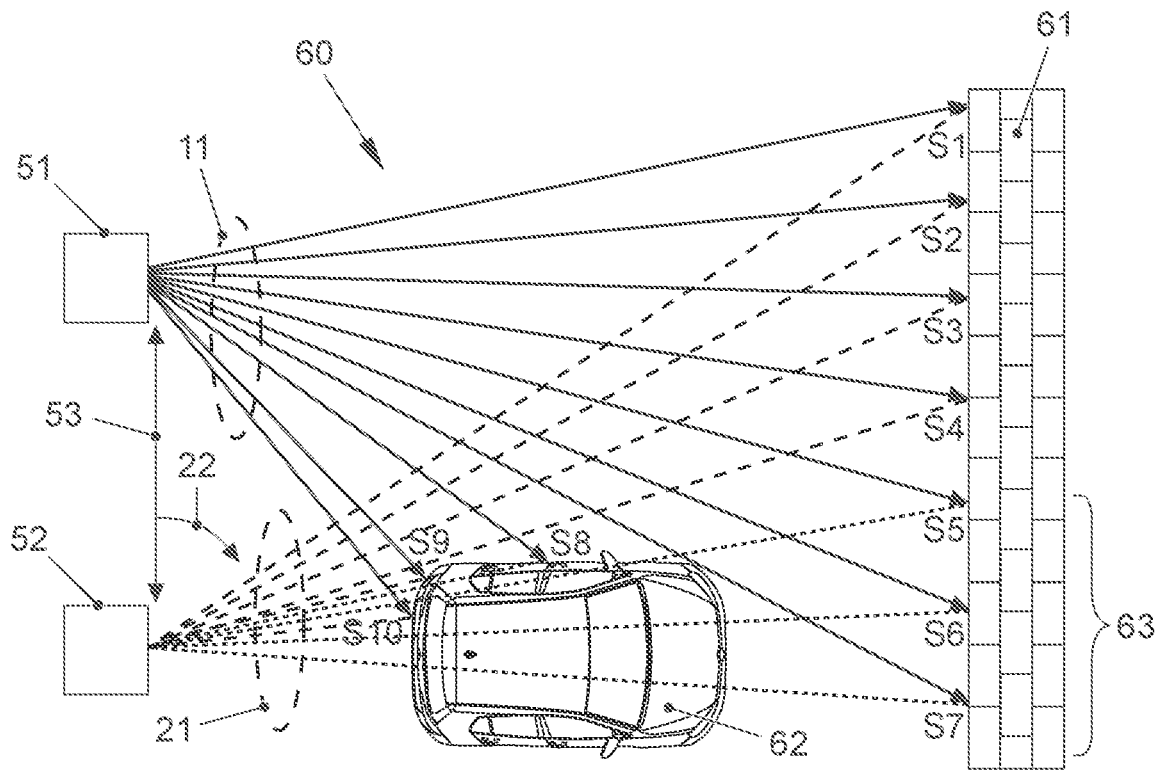
FIG. 2 shows a schematic representation to illustrate the method for detecting a parallax problem in sensor data from two sensors.

FIG. 2 shows a schematic illustration of the method for determining a parallax problem in sensor data from two sensors 51, 52. The sensors 51, 52 are a distance 53 from each other and capture an overlapping region of an environment 60. Sight rays 11, 21 of the sensors 51, 52 are also shown, wherein the sight rays 11, 21 correspond in each case to acquisition directions for individual measured values of the sensor data, projected according to the respective imaging conditions. In the example shown, the sensor 51 is a LIDAR sensor that provides three-dimensional measurements of objects 61, 62 of the environment 60. The other sensor 52 is a camera, which provides a camera image as sensor data.

In the environment 60 there is a flat wall 61 and an object 62, such as another transportation vehicle. Due to the distance 53 between them, the sensors 51, 52 detect the object 62 from different directions. The sensor 51 detects the wall 61 in a region 63 past the object 62, while the wall 61 is concealed in this region 63 by the object 62 from the point of view of the sensor 52. A parallax problem therefore exists.

To check whether a parallax problem exists in the sensor data, the measured values in the acquired sensor data of the one sensor 51 (LIDAR sensor) are assigned to measured values corresponding to them in the acquired sensor data of the other sensor 52 (camera), wherein the assignment takes into account the respective imaging conditions of the two sensors 51, 52.

The assignment is carried out by projecting the measured values of the sensor data of the sensor 51 (LIDAR sensor) back into an image space formed from the measured values of the sensor data of the other sensor 52 (camera). In simple terms, the three-dimensional measured values of the sensor 51 (LIDAR sensor) are projected into the image space of the sensor 52 or into the captured camera image in accordance with the imaging conditions. In this example, the assignments of the measured values or sight rays 11 with the numerals S8, S9 and S10 are particularly significant, since these relate to the object 62.

Then, according to the described method, the measured values of the sensor data, which correspond to individual sight rays 11, 21 in FIG. 2, are numbered consecutively—as shown schematically—with the numerals S1 to S8. The consecutive numbering is performed in the sequence in which they are acquired, or the sequence of the associated measured values or image elements in the camera image. For example, the individual measured values corresponding to individual sight rays 11, 21 are numbered consecutively from top to bottom, as shown in FIG. 2.

It is then checked whether a sorting order of the numbering of the measured values projected onto each other matches, i.e., whether a sorting order of the numerals S1 to S10 of the measured values of the sensor data of the sensor 51 (LIDAR sensor) differs in relation to the sorting order of the numerals S1 to S8 of the measured values of the sensor data of the sensor 52 (camera). Due to the presence of the object 62 and the resulting parallax problem, this is the case here for the sight ray 11 of the sensor 51 with the numeral S8. In the absence of a parallax problem this would be expected to be assigned to a sight ray 21 of the sensor 52 with the numeral S8 but, due to its position, in the projection into the image space (camera image) of the sensor 52

(camera) it is located before a sight ray 21 with the numeral S5. Therefore, with respect to the camera image the sorting orders do not match, so that a parallax problem is detected.

It is provided that, to check the sorting order, a sign of angular changes between adjacent measured values of the sensor data of the sensor 51 is evaluated with respect to the mutually assigned measured values of the sensor data of the other sensor 52, a parallax problem being detected if at least one sign change occurs during the angle changes. For this purpose, in the image space of the sensor 52 an angle 22 of each of the measured values of the sensor data of the sensor 51 that are projected into the image space is determined (in relation to FIG. 2 in a clockwise direction).

After determining the angle 22 for the individual sight rays 11 in the image space, the results obtained are summarized in the following table:

| | Sight ray sensor 51 (numeral) | | | | | | | | | |
|---|---|---|---|---|---|---|---|---|---|---|
| | S1 | S2 | S3 | S4 | S5 | S6 | S7 | S8 | S9 | S10 |
| Sign of angle change in image space | | – | – | – | – | – | – | + | – | – |
| Class in the image space | wall | wall | wall | wall | object | object | object | object | object | object |

For the sight ray 11 with the numeral S8, the sign changes because, in the projection of the sensor 52 into the image space, i.e., into the captured camera image, it is located before the sight rays 21 with the numerals S5, S6, S7. Since a change in the sign of the angle change has occurred, a parallax problem is detected.

It can be provided that measured values of the sensor data of the sensor 51 (LIDAR sensor), which are located within a region 63 defined by the non-matching sorting order, are marked as invalid. The region in this case is defined by the measured values or sight rays 11 which are included in the measured value or sight ray 11 with the numeral S8, i.e., which are affected by the reversal in the image space (camera image). In the present case these are the measured values or sight rays 11 with the numerals S5, S6 and S7. This can be clearly seen in FIG. 2. The affected measured values or sight rays 11 are all located in the region 63, which cannot be captured by the sensor 52 (camera), since this is concealed by the object 62.

The benefit of the described method and the apparatus is that they are simple to implement and only require a small amount of computing power.

LIST OF REFERENCE SIGNS

1 apparatus
2 input device
3 computing device
4 output device
10 sensor data
11 sight ray
20 sensor data
21 sight ray
22 angle
30 verification result
50 transportation vehicle
51 sensor (LIDAR sensor)
52 sensor (camera)
53 distance
60 environment
61 wall
62 object
63 region
Sx numeral (measured value or sight ray)

The invention claimed is:

1. An apparatus for detecting parallax in sensor data from a plurality of sensors including a first sensor and a second sensor, wherein the first sensor and the second sensor are arranged at positions spaced apart from each other and at least partially capture an environment, and at least the first sensor provides distance information, the apparatus comprising:
an input device;
a computing device; and
an output device,
wherein the input device receives sensor data acquired by the plurality sensors,
wherein the computing device assigns measured values in acquired sensor data of the first sensor to corresponding measured values in acquired sensor data from the second sensor, the assigning taking imaging conditions of the plurality of sensors into account,
wherein the computing device further consecutively numbers the measured values in the acquired sensor data of the first sensor and the corresponding measured values in the acquired sensor data from the second sensor and checks whether a sorting order of the corresponding measured values matches, and performs parallax detection in response to the sorting order not matching, and
wherein the checking whether the sorting order of the corresponding measured values matches comprises evaluating a sign of angular changes between adjacent measured values of the sensor data of the first sensor providing the distance information with respect to the corresponding measured values of the sensor data of the second sensor and performing parallax detection in response to at least one sign change occurring during the angular changes, and
wherein the output device outputs a verification result.

2. The apparatus of claim 1, wherein the computing device further carries out the assigning of the measured values by back projection of the measured values of the sensor data of the first sensor into an image space formed from the measured values of the sensor data of the second sensor.

3. A transportation vehicle comprising:
a first sensor, a second sensor, and the apparatus for detecting parallax of claim 1.

4. The transportation vehicle of claim 3, wherein the first sensor is a LIDAR sensor and the second sensor is a camera.

5. A method for detecting parallax in sensor data from a plurality of sensors including a first sensor and a second sensor, wherein the plurality of sensors are arranged at positions defined by a spaced apart distance from each other and at least partly capture an environment, the first sensor providing distance information, the method comprising:

obtaining the acquired sensor data from the plurality of sensors;

assigning measured values in acquired sensor data of the first sensor to corresponding measured values in acquired sensor data of the second sensor, wherein the assigning takes respective imaging conditions of the plurality of sensors into account;

consecutively numbering the measured values in the acquired sensor data of the first sensor and the corresponding measured values in the acquired sensor data of the second sensor;

checking whether a sorting order of the numbering of the corresponding measured values matches, and performing parallax detection in response to the sorting order not matching;

wherein the checking whether the sorting order of the corresponding measured values matches comprises evaluating a sign of angular changes between adjacent measured values of the sensor data of the first sensor providing the distance information with respect to the corresponding measured values of the sensor data of the second sensor and performing parallax detection in response to at least one sign change occurring during the angular changes, and outputting a test result.

6. The method of claim 5, wherein the assigning of the measured values is performed by back projection of the measured values of the sensor data of the first sensor into an image space formed from the measured values of the sensor data of the second sensor.

7. The method of claim 5, wherein measured values of the sensor data of the first sensor, which are located within a range defined by the sorting order not matching, are marked as invalid.

8. The method of claim 6, further comprising, in response to detection of an object by the plurality of sensors, checking whether sensor data of the first sensor completely captures the object with respect to a dimension characterized by the spaced apart distance between the sensors, and deriving a verification result which is taken into account when checking the parallax.

* * * * *